(12) United States Patent
Hofmann et al.

(10) Patent No.: US 6,504,854 B1
(45) Date of Patent: Jan. 7, 2003

(54) MULTIPLE FREQUENCY COMMUNICATIONS

(75) Inventors: Richard Gerard Hofmann, Cary, NC (US); Mark Michael Schaffer, Cary, NC (US); Thomas Andrew Sartorius, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/058,724

(22) Filed: Apr. 10, 1998

(51) Int. Cl.[7] .................................................. H04J 3/06
(52) U.S. Cl. .......................... 370/518; 370/365; 710/27; 710/38; 710/116
(58) Field of Search ............................... 370/518, 232, 370/235, 252, 285, 362, 365, 401, 419, 420, 489; 710/8, 14, 15, 21, 22, 29, 38, 110, 116, 128, 20, 27, 33, 35, 41, 62, 113, 126, 127, 129, 358, 359, 362, 364

(56) References Cited

U.S. PATENT DOCUMENTS

| 5,125,084 A | | 6/1992 | Begun et al. ................. 395/375 |
| 5,142,672 A | | 8/1992 | Johnson et al. .............. 395/500 |
| 5,428,751 A | | 6/1995 | Dollinger et al. ............ 395/325 |
| 5,491,814 A | * | 2/1996 | Yee et al. ...................... 710/28 |
| 5,542,053 A | | 7/1996 | Bland et al. ................. 395/309 |
| 5,561,821 A | | 10/1996 | Gephardt et al. ............ 395/848 |
| 5,625,847 A | * | 4/1997 | Ando et al. .................. 713/501 |
| 5,664,142 A | | 9/1997 | Boldt et al. .................. 711/112 |
| 5,729,705 A | * | 3/1998 | Weber ........................ 710/315 |
| 5,925,134 A | * | 7/1999 | Solomon ..................... 713/324 |
| 5,928,346 A | * | 7/1999 | Johnson et al. ............. 710/110 |
| 6,079,022 A | * | 6/2000 | Young ........................ 713/300 |
| 6,256,684 B1 | * | 7/2001 | Klein .......................... 710/35 |

FOREIGN PATENT DOCUMENTS

JP            90-224048          9/1990

* cited by examiner

Primary Examiner—Douglas Olms
Assistant Examiner—Phirin Sam
(74) Attorney, Agent, or Firm—Scott W. Reid; Myers, Bigel, Sibley + Sajovec, P.A.

(57) ABSTRACT

A communication system is provided for use in processing systems and the like for carrying out data transfer operations between a first data bus and a peripheral device associated with a second data bus, wherein the first data bus operates at a first clock speed and wherein the second data bus operates. at a second clock speed which is different from the first clock speed and a 1/N integer multiple of the first clock speed. A sample signal associated with the second clock speed is received and the speed of operation of a state machine of a peripheral controller is dynamically adjusted in response to the sample signal such that the state machine of the peripheral controller operates at the second clock speed and causes operations on the second data bus to occur synchronously at the second clock speed.

24 Claims, 5 Drawing Sheets

MULTIPLE FREQUENCY COMMUNICATIONS

FIELD OF THE INVENTION

The present invention relates generally to communications interfaces. More particularly the present invention relates to communications interfaces for communication between communication buses operating at different clock speeds.

BACKGROUND OF THE INVENTION

In many modern data processing systems, a processor communicates with other local devices utilizing a high speed communications bus. Thus, for example, processors may communicate with internal cache or other such high speed functions over the high speed communications bus. Problems may arise, however, when a peripheral cannot or need not operate at the clock rate of the high speed communications bus. In such a case it has been conventional to provide separate communications buses which operate at lower speeds to accommodate such lower speed peripherals. Such peripherals may be integrated with the processor or they may be external to the processor. In any event, the difference in clock speeds of the high speed bus utilized by the processor and the lower speed peripheral bus may result in increased hardware and more complex systems to accommodate the various bus speeds.

In more complex systems, peripherals requiring differing bus speeds may be utilized in the same system. Thus, in such systems the capability to communicate from differing slower speed buses to a higher speed bus is generally required. This addition of multiple slower speed buses may further complicate the system as the system must take into account the characteristics of each slower speed bus.

For example, in providing Direct Memory Access (DMA) functions between buses of differing speeds it has been conventional to provide a DMA controller for each bus which interfaces between the differing bus speeds using a third bus common to both controllers. One such system is described in U.S. Pat. No. 5,664,142 to Boldt et al. This system, however, would utilize a DMA controller for each bus speed. Furthermore, the bus speed is typically required to be known in advance which may limit the flexibility of the Boldt et al. system.

Additional interfaces between different speed buses are found in U.S. Pat. Nos. 5,125,084, 5,142,672 5,428,751 and 5,561,821. However, these references all utilize DMA devices which operate at fixed speeds, thus increasing the complexity of utilizing these systems where peripherals on multiple slower speed buses communicate with a higher speed bus.

In light of the above discussion, a need exists for improvements in communications between buses operating at differing speeds.

OBJECTS AND SUMMARY OF THE INVENTION

In view of the above it is one object of the present invention to provide a communication interface which allows for communications with buses of differing speeds.

A further object of the present invention is to provide for communications with differing speed buses utilizing a common controller for the differing speed buses.

Still another object of the present invention is to provide communications at the clock speed of each bus of differing clock speed buses.

Another object of the present invention is to provide a communication system which may be adjusted from system to system without requiring modifications to the controller.

In view of these and other objects of the present invention, the present invention provides a communication system for use in data processing systems for carrying out data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed. A sample signal associated with the second clock speed is received from a device associated with a clock domain of the second bus. The speed of operation of a state machine of a peripheral controller is dynamically adjusted in response to the sample signal such that the state machine of the peripheral controller operates at the second clock speed and causes operations on the second data bus to occur at the second clock speed.

The dynamic adjustment may be accomplished by gating a clock operating at the first clock speed which clocks a state machine of a peripheral controller with the sample signal such that the state machine of the peripheral controller operates at the second clock speed and causes operations on the second data bus to occur at the second clock speed. Thus, data may be provided to and received from the first bus at the first clock speed and data may be provided to and received from the second bus at the second clock speed. Furthermore, the gating may be accomplished by a logical ANDing of the sample signal with clock pulses at the first clock speed so as to create a clock of the second clock speed.

By dynamically adjusting the speed of the controller, a communication interface which allows for communications with buses of differing speeds is provided. Furthermore, a common controller for the differing speed buses may be utilized because the speed of the controller is adjusted to the speed of the second bus. The present invention also provides communications on each bus of differing clock speed buses at the clock speed of the bus. Also, because the controller is dynamically adjusted to the speed of the bus, the controller may accommodate differing bus speeds without requiring modifications to the controller.

In particular embodiments of the present invention, the sample signal is generated so as to be active during a cycle of the clock at the first clock speed immediately prior to a transition of the clock at the second clock speed.

In further embodiments, the first bus is an internal bus and the second bus is an external bus. Also, the peripheral controller may be a DMA controller.

In still another embodiment of the present invention, the peripheral controller further controls communications between the first bus and a second peripheral device associated with a third bus which operates at a third clock speed which is different from the first clock speed and a 1/N integer multiple of the first clock speed. In such a case, a second sample signal associated with the third clock speed is received from the second peripheral and the speed of operation of the state machine of the peripheral controller is dynamically adjusted in response to the second sample signal such that the state machine of the peripheral controller operates at the third clock speed and causes operations on the third data bus to occur at the third clock speed. Furthermore, the adjustment of the speed of operation of the state machine may be achieved by gating the clock operating at the first clock speed which clocks the state machine of the peripheral controller with the second sample signal so as to provide clock pulses to the state machine at the third clock speed such that the state machine of the peripheral controller causes operations on the third data bus to occur at the third clock speed. The second clock speed and the third clock speed may be different clock speeds.

In a further embodiment of the present invention, a communication system for allowing DMA communication between multiple buses is provided which includes a first bus utilizing a first clock operating at a first clock speed and a second bus utilizing a second clock operating at a second clock speed wherein the second clock speed is different from the first clock speed and is a 1/N integer multiple of the first clock speed. A first bridge slave transmits and receives data to and from the first bus and transmits and receives data to and from the second bus. The bridge slave provides a first sample signal corresponding to the second clock speed. A DMA master operably associated with the first bridge slave and which generates control signals for controlling communications to and from the first and second buses, includes a DMA state machine corresponding to a transfer state on the second bus. The DMA state machine is clocked by the first clock gated with the first sample signal from the first bridge slave so as to clock the DMA state machine at the second clock speed.

In a further embodiment, the first bridge slave includes means for generating the first sample signal so as to be active during a cycle of the first clock immediately prior to a transition of the second clock. The DMA master may also include an AND gate for ANDing the first sample signal with the first clock so as to create a clock operating at the second clock frequency.

In particular embodiments, the first bus is an internal bus and the second bus is an external bus. In still another embodiment, the first bridge slave transmits and receives data to and from the first bus at the first clock speed and transmits and receives data from the second bus at the second clock speed.

A further embodiment of the present invention includes a third bus utilizing a third clock operating at a third clock speed wherein the third clock speed is a 1/N integer multiple of the first clock speed. A second bridge slave transmits and receives data to and from the first bus and transmits and receives data to and from the third bus. The bridge slave further provides a second sample signal corresponding to the third clock speed. The DMA master is further operably associated with the second bridge slave and generates control signals for controlling communications to and from the first and third buses. The DMA state machine is clocked by the first clock gated with the first sample signal from the first bridge slave so as to clock the DMA state machine at the second clock speed when communicating between the first and second buses. The DMA state machine is clocked by the first clock gated with the second sample signal from the second bridge slave so as to clock the DMA state machine at the third clock speed when communicating between the first and third buses. In a particular embodiment, the second and third clock speed are different clock speeds.

As will be appreciated by those of skill in the art, the present invention may further take the form of slave, and/or master functions capable of carrying out the above described operations. Furthermore, the present invention may be embodied as methods or systems for controlling communications or as a peripheral controller.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method or data processing system. Accordingly, the present invention may take the form of an entirely hardware embodiment, an entirely software embodiment or an embodiment combining software and hardware aspects.

Figure 1:
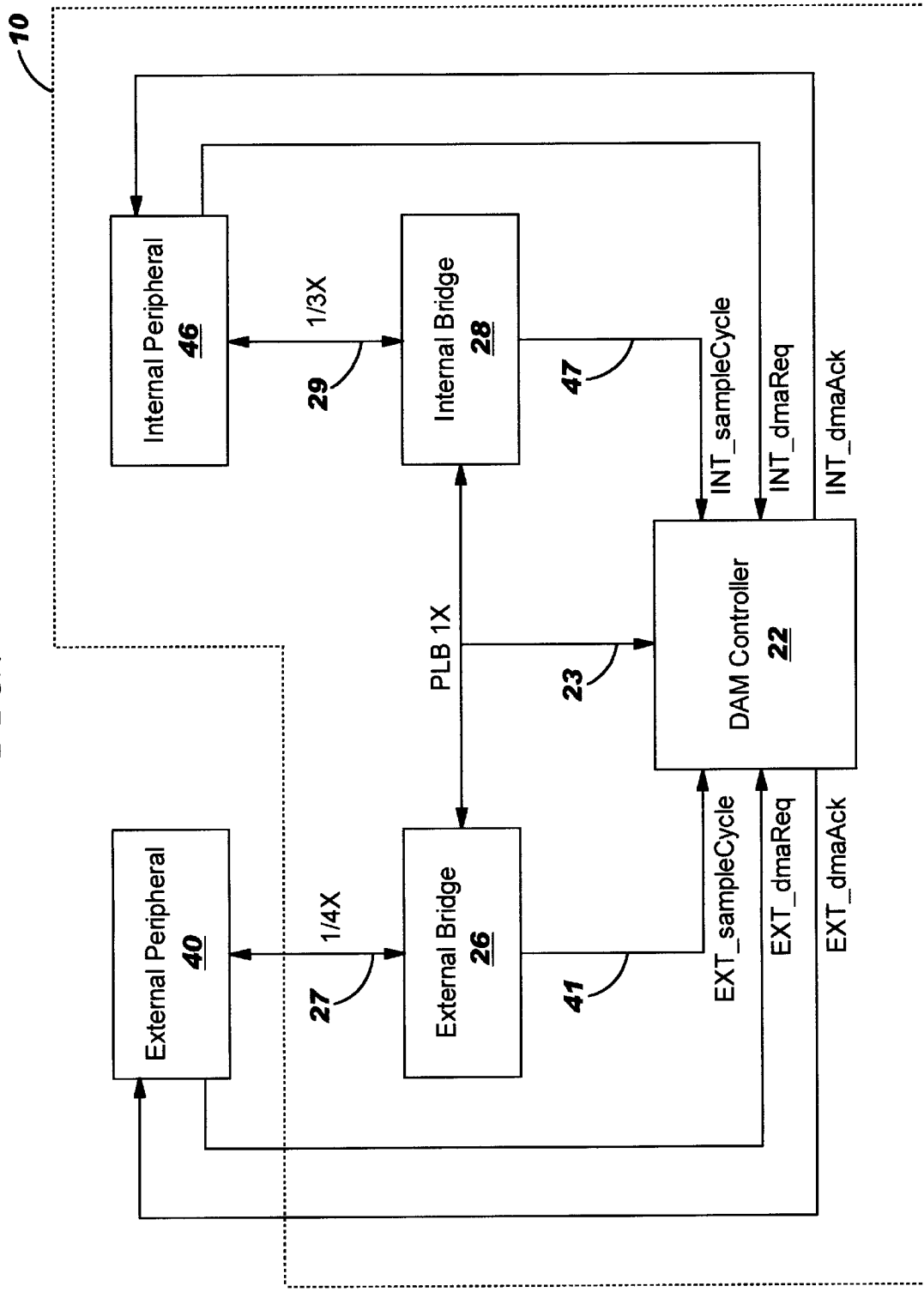
FIG. 1 is a block diagram of a system utilizing the present invention.

FIG. 1 illustrates one embodiment of the present invention which preferably includes a portion 10 in a single integrated circuit. As seen in FIG. 1, a DMA controller 22, communicates over a Processor Local Bus (PLB) 23 which operates at a first clock speed utilizing a first clock. The DMA controller 22 may communicate with any number of other functions including the external bridge 26 and internal bridge 28 illustrated in FIG. 1. As will be appreciated by those of skill in the art, the present invention may be utilized to allow a function, such as the DMA controller 22 to communicate with any number of other functions or devices operating at speeds other than the first clock speed.

As is illustrated in FIG. 1, the external bridge 26 allows communication between the PLB 23 and an external bus 27. The external bus may operate at a different clock speed than the PLB 23 but this clock speed should be a 1/N integer multiple of the first clock speed. Thus, as is seen in FIG. 1, the external bus may operate at a second clock speed utilizing a second clock with a frequency of ¼ the frequency of the first clock. The DMA controller 22 may communicate with the external peripheral 40 through the external bridge 26 utilizing the PLB 23 at the first clock speed and the external bus 27 at the second clock speed. Communications between the external peripheral 40 and the DMA controller 22 may be controlled by the DMA controller 22 utilizing, for example, control signals such as the EXT_dmaReq and EXT_dmaAck signals illustrated in FIG. 1. These control signals are synchronized to the second clock speed of the external bus 27. The DMA controller 22 synchronizes with the second clock speed of the external bus 27 by utilizing the EXT_sampleCycle signal to gate the first clock so as to create a clock pulse at the frequency of the second clock speed. Preferably this gated clock pulse is utilized to clock an internal state machine utilized by the DMA controller 22 to control the activities on the external bus 27.

Similarly, as is illustrated in FIG. 1, the internal bridge 28 allows communication between the PLB 23 and an internal bus 29. The internal bus 29 may operate at a different clock speed than the PLB 23 but this clock speed should be an 1/N integer multiple of the first clock speed. Thus, as is seen in FIG. 1, the internal bus 29 may operate at a third clock speed utilizing a third clock with a frequency of ⅓ the frequency of the first clock. The DMA controller 22 may communicate with the internal peripheral 46 through the internal bridge 28 utilizing the PLB 23 at the first clock speed and the internal bus 29 at the third clock speed. Communications between the internal peripheral 46 and the DMA controller 22 may be controlled by the DMA controller 22 utilizing, for example, control signals such as the INT_dmaReq and INT_dmaAck signals illustrated in FIG. 1. These control signals are synchronized to the third clock speed of the internal bus 29. The DMA controller 22 synchronizes with the third clock speed of the internal bus 29 by utilizing the INT_sampleCycle signal to gate the first clock so as to create a clock pulse at the frequency of the third clock speed. Preferably this gated clock pulse is utilized to clock the internal state machine utilized by the DMA controller 22 to control the activities on the internal bus 29.

By utilizing the sampleCycle signals provided for each bus, the state machine of the DMA controller 22 may be synchronized to any 1/N integer multiple of the first clock. Thus, a single state machine may be utilized for different bus rates and any number of different bus rates may be utilized. Furthermore, by gating the first clock with the sample signal, the complexity of the DMA controller 22 may be reduced. Because the DMA controller interacts with both the higher speed PLB 23 and the lower speed external and internal buses 27 and 29, the DMA controller must during a single operation utilize both the higher clock speed and the lower clock speeds. Because the lower speed clock is a gated pulse of the higher speed clock, the clock utilized for communications on the slower speed bus is synchronized to the higher speed PLB 23. Thus, races and other timing considerations may be greatly simplified which simplifies the DMA controller 22.

In operation, the DMA controller 22 receives a request for a DMA transfer from either the external peripheral 40 or the internal peripheral 46. The DMA controller 22 use the appropriate sampleCycle signal to gate the first clock to provide a lower frequency clock to the state machine of the DMA controller. The state machine then cycles through the appropriate states of the operation at the lower frequency which results in control signals such as the dmaAck signal being provided synchronized to the lower frequency of the external bus 27 or the internal bus 29.

Figure 2:
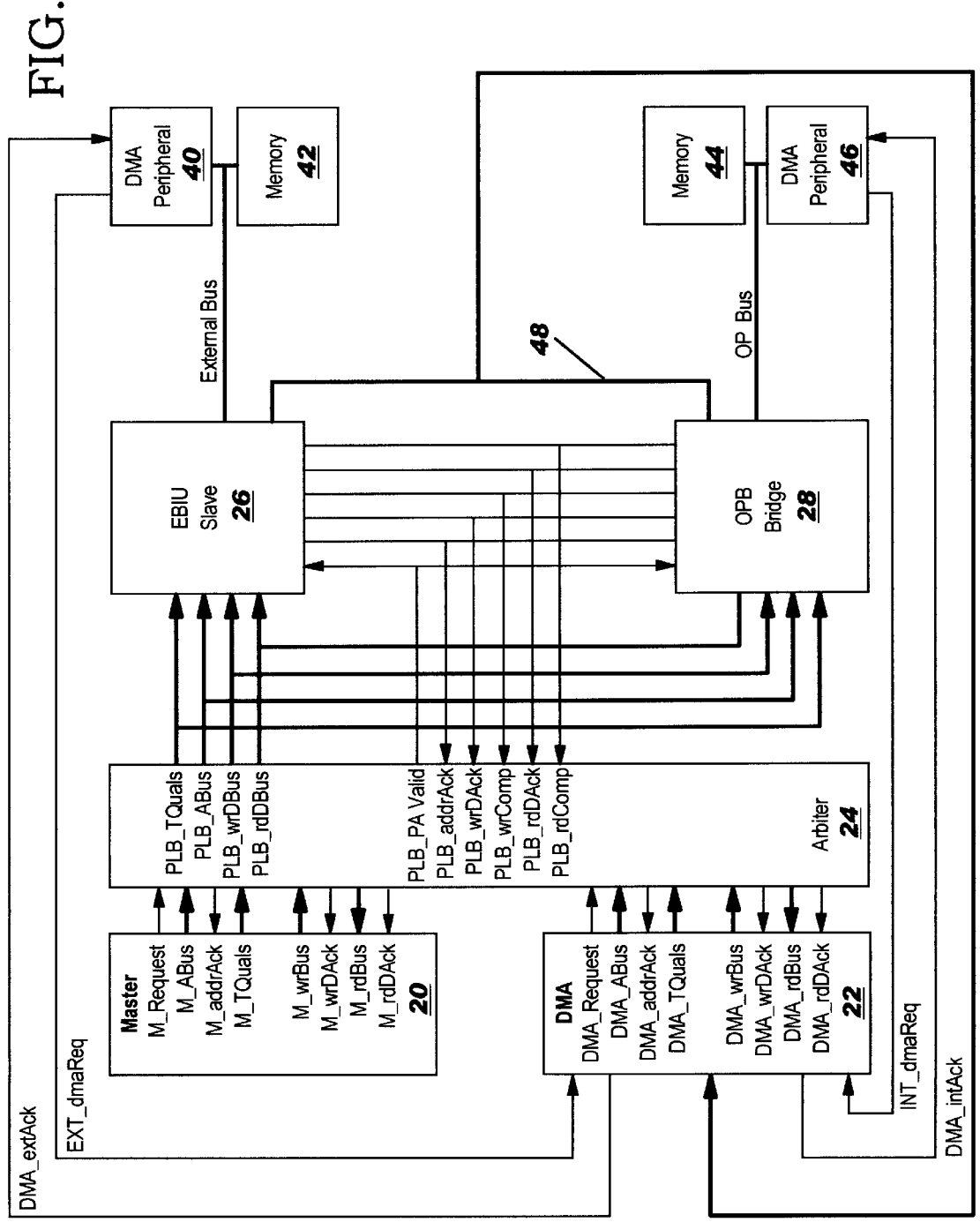
FIG. 2 is a block diagram of a particular embodiment of the present invention.

FIG. 2 illustrates a particular embodiment of the present invention. As seen in FIG. 2 a master function 20 is connected to an arbiter 24. A slave function 26 is also connected to the arbiter 24. The slave function 26 illustrated in FIG. 2 is an External Bridge Interface Unit (EBIU) which allows communication between the higher speed processor local bus and the lower speed external bus. As FIG. 2 shows, the present invention may facilitate interconnection of a plurality of master functions depicted as Master 20 and DMA 22. Similarly, the present invention may also facilitate interconnection of a plurality of slave devices as is illustrated in FIG. 2 by EBIU Slave 26 and On-chip Peripheral Bus (OPB) Bridge Slave 28. Preferably, at least one slave function, one master function and the arbiter are contained within a single integrated circuit. More preferably, all master functions, all slave functions and the arbiter are contained within a single integrated circuit 10.

As seen in FIG. 2, the slave devices 26 and 28 are interconnected by an address bus (PLB_ABus). The slave devices 26 and 28 are also connected by a write data bus (PLB_wrDBus) and a read data bus (PLB_rdDBus). The slave functions 26 and 28 also receive a group of signals referred to herein as transfer qualifiers (PLB_TQuals). Transfer qualifiers include information about whether the transfer for which an address is present on the address bus is a read or write transfer, the size of the transfer, the type of transfer, (e.g. byte aligned, line or burst) byte enables for the transfer, the priority or order of the transfer, speculative memory access information or other information about a particular transfer.

The slave functions 26 and 28 are also connected to the arbiter 24 by a series of control signals. These signals include an address valid signal (PLB_PAValid) which is received by the slave functions 26 and 28 and which is asserted by the arbiter 24 when a valid address is on PLB_ABus. The slave functions 26 and 28 also drive an address acknowledge signal (PLB_addrAck) to the arbiter 24 when a slave function receives an address within the range of addresses assigned to the slave function. The slave function receiving data from PLB_wrDBus also asserts a write data acknowledge signal (PLB_wrDAck) for each cycle of data properly received by the slave. During the last cycle of valid data on PLB_wrDBus the slave function asserts a write complete signal (PLB_wrComp) to indicate the final cycle of the transfer.

In a similar fashion to the write control signals, the slave function placing read data on PLB_rdDBus asserts a read data acknowledge signal (PLB_rdDAck) for each cycle of valid data on PLB_rdDBus. The slave function also asserts a read complete signal (PLB_rdComp) on either the last or the second to last cycle of the transfer. Whether PLB_rdComp is asserted on the last cycle or the second to last cycle is dependent upon whether the slave function is utilizing an early read complete protocol.

Turning to the interconnection of the master functions 20 and 22, each master is connected to the arbiter 24 by its own set of buses and control signals. As seen in FIG. 2 each master function 20 and 22 has its own request line (M_request and DMA_request) to the arbiter 24. The master function asserts the request line to notify the arbiter of a request for a read or write operation. Each master function 20 and 22 also has its own address bus (M_ABus and DMA_ABus), write data bus (M_wrDBus and DMA_wrDBus), read data bus (M_rdDBus and DMA_rdDBus) and transfer qualifiers (M_TQuals and DMA_TQuals). The master functions 20 and 22 transmit the initial address on the address bus (M_ABus and DMA_ABus) and the transfer qualifiers (M_TQuals and DMA_TQuals) while the request is asserted and until the master function asserting the request (20 or 22) receives an acknowledge signal (M_addrAck and DMA_addrAck) from the arbiter 24. As discussed below, the master functions 20 and 22 may also transmit the write data on the write data bus (M_wrDBus and DMA_wrDBus) when the request is asserted if the operation requested is a write operation. The master functions 20 and 22 also receive read data acknowledge (M_rdDAck and DMA_rdDAck) and write data acknowledge (M_wrDAck and DMA_wrDAck) signals from the arbiter 24. As discussed more fully below, these buses and control signals carry out essentially the same functions between the master functions 20 and 22 and the arbiter 24 as their corresponding buses and control signals do between the slave functions 26 and 28 and the arbiter 24.

Also illustrated in FIG. 2 are peripheral devices connected to the External Bus associated with the EBIU Slave 26 and the OP Bus associated with the OPB Bridge Slave 28. Connected on the External bus is DMA Peripheral 40 and memory 42. The memory 42 and DMA peripheral 40 communicate with EBIU Slave 26 over the External Bus and through the EBIU Slave with DMA master 22. Connected on the OP Bus are memory 44 and DMA Peripheral 46. The memory 44 and DMA Peripheral 46 communicate with the OPB Bridge Slave 28 over the OP Bus and through the OPB Bridge Slave 26 with the DMA master 22. The OP Bus and the External Bus both operate at frequencies which are 1/N integer multiples of the frequency of operation of the processor local bus used to communicate with the EBIU Slave 26 and the OPB Bridge Slave 28. For purposes of illustration, the External Bus operates at ⅓ the clock speed of the processor local bus. Similarly, as is illustrated in FIG. 2, the DMA peripherals 40 and 46 also provide Ext_dmaReq and INT_dmaReq signals to the DMA master 22 and receive DAM_extAck and DMA_intACK signals from the DMA master 22.

The EBIU Slave 26 and the OPB Bridge Slave 28 also communicate directly with the DMA master 22 using the Control Signal Bus 48. Included in the Control Signal Bus 48 are the sampleCycle signals corresponding to the clock speeds of the corresponding External Bus (Ext_sampleCycle) and the OP Bus (INT_sampleCycle) which are provided by the EBIU Slave 26 and the OPB Bridge Slave 28 respectively. As described above, the sampleCycle signals are utilized by the DMA master 22 to gate the clock of the processor local bus to provide clock pulses at the frequency of the corresponding lower speed bus. Also a DMA_dataXfer signal may also be provided to tell the slave function 26 or 28 when data is valid on the External Bus or the OP Bus.

Operation of the present invention will now be described with reference to the flow chart of FIG. 3 and the timing charts of FIG. 4 and FIG. 5. It will be understood that certain blocks of the flowchart illustrations, and combinations of blocks in the flowchart illustration, can be implemented by computer program instructions. These computer program instructions may be executed by a general purpose processor or other programmable data processing apparatus to produce a machine, such that the instructions which execute on the general purpose processor or other programmable data processing apparatus create means for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Figure 3:
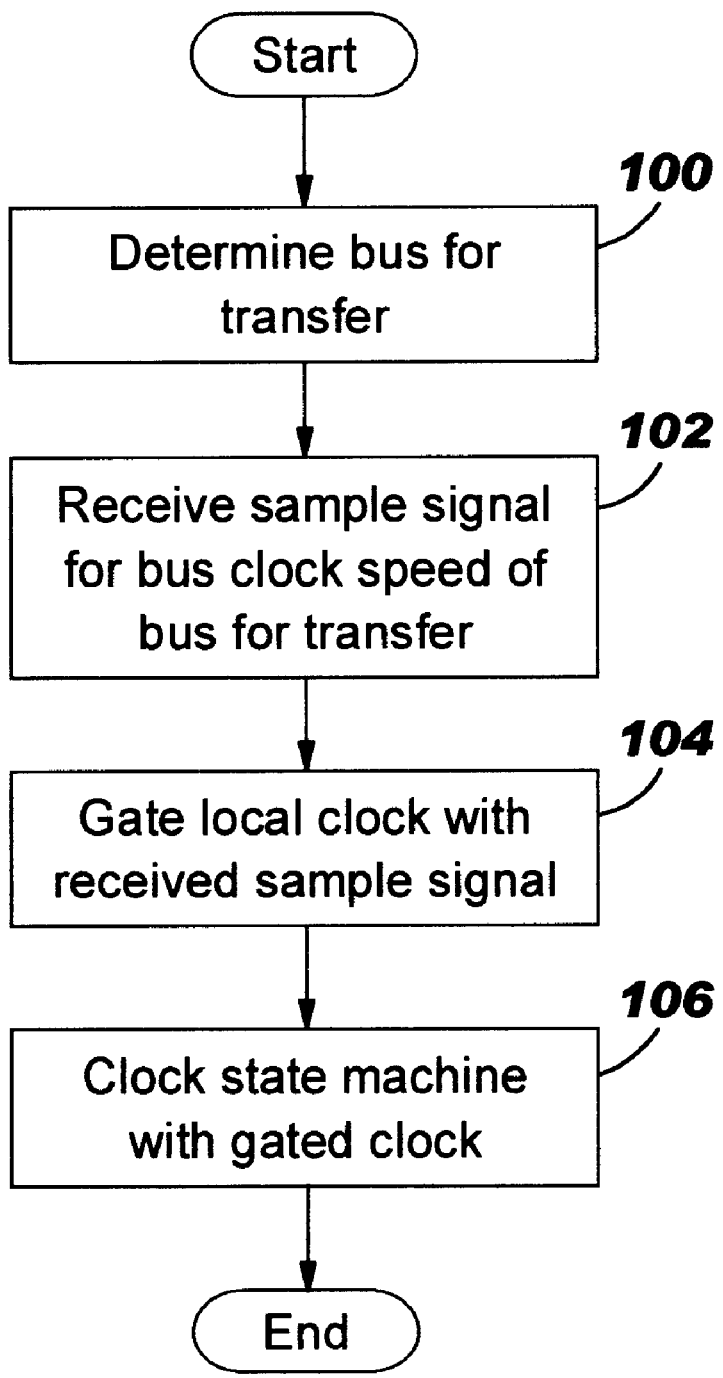
FIG. 3 is a flow chart illustrating operations according to the present invention.

As seen in FIG. 3, when a dmaReq is asserted to indicate a DMA request to the DMA master 22, the DMA master 22 determines the bus associated with the DMA request (block 100). Such a determination may be made by, for example, a location bit in a DMA control register which indicates the location of the peripheral. The DMA master 22 also receives the sampleCycle signal from the slave corresponding to the bus on which the peripheral resides and selects that sampleCycle signal for use in the transfer (block 102). The DMA master 22 gates the clock of the processor local bus with the selected sampleCycle signal so as to produce a second clock at the frequency of the bus of the peripheral (block 104) and uses that clock to clock the state machine of the DMA master 22 for controlling operations on the peripheral bus (block 106).

Figure 4:
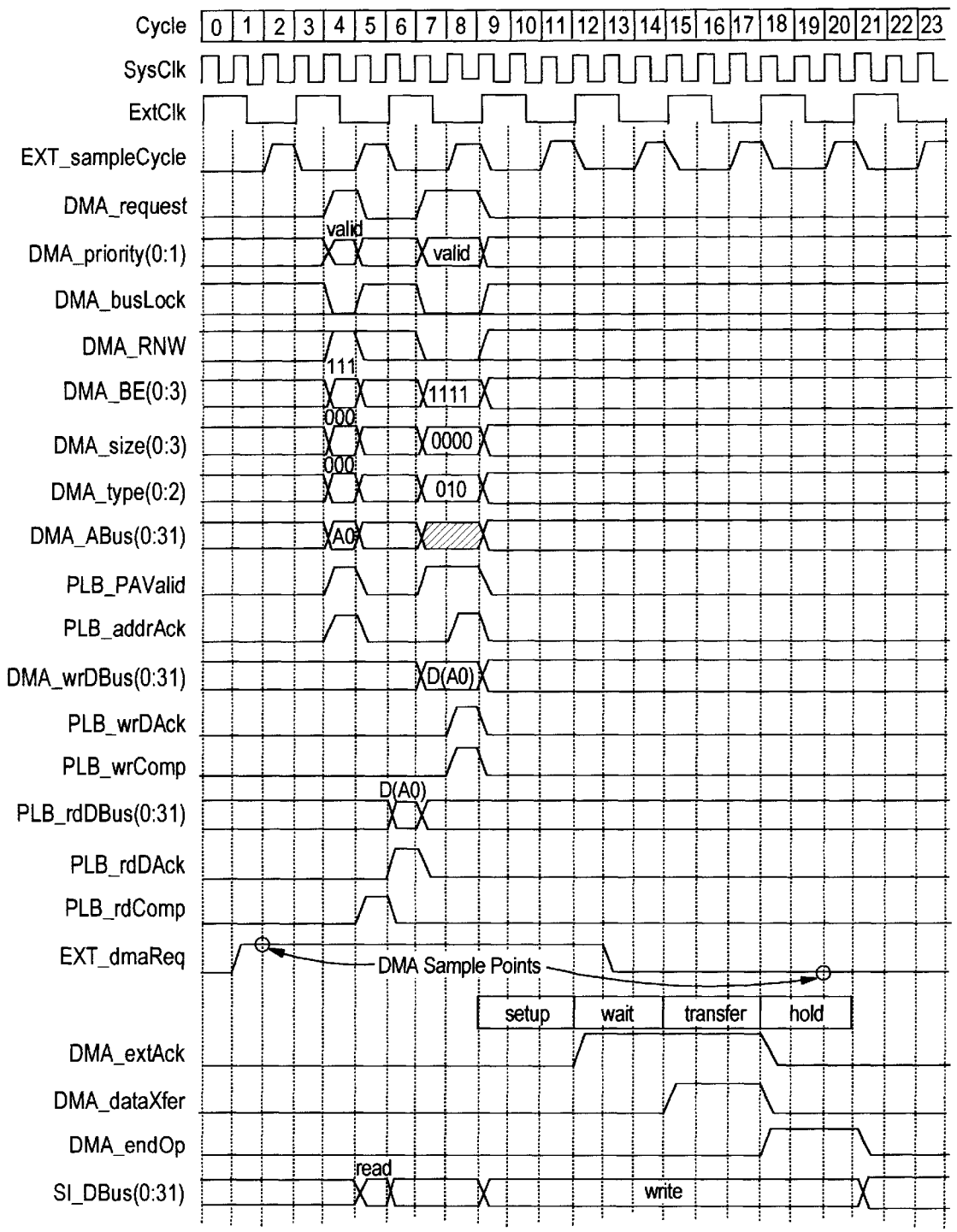
FIG. 4 is a timing diagram illustrating a write operation in a system according to the embodiment of the present invention illustrated in FIG. 2.

An example of a DMA write operation is seen in FIG. 4 where external peripheral 40 initiates a request by activating EXT_dmaReq in cycle 1. For purposes of illustration, the external clock (extClk) associated with the External Bus is ⅓ the clock frequency of SysClk which is the clock associated with the processor local bus. The DMA master 22 double synchronizes EXT_dmaReq to the SySClk and responds by requesting from the arbiter 24 a read transfer from the EBIU Slave 26. This transfer request is seen in cycle 4 by the assertion of DMA_request with the address and Tqual information also being asserted. The request is acknowledged by the slave by the assertion of PLB_addrAck (which is provided to the DMA master 22 as DMA_addrAck) and the EBIU Slave 26 reads the data from memory, asserts PLB_rdComp in cycle 5 and provides the read data with PLB_rdDAck in cycle 6 (which is provided to the DMA master 22 as DMA_rdDAck). Each of these operations is carried out at the SysClk clock speed of the processor local bus.

The DMA master 22 buffers the data internally and requests a peripheral write transfer by again asserting DMA_request (cycle 7) which is acknowledged by assertion of PLB_addrAck, PLB_wrDAck and PLB_wrComp incident with EXT_sampleCycle which results in the appropriate signals placed on corresponding DMA_addrACK and DMA_wrDAck DMA inputs. The EBIU Slave 26 begins driving the latched write data on the external bus. The DMA master 22 inserts on external clock of setup time (illustrated as "setup" in FIG. 4) and then asserts DMA_extAck in cycle 12. The DMA master 22 knows the duration of the external clock cycle through the use of EXT_sampleCycle as the "setup" state of the state machine in the DMA master 22 is clocked with the SysClk gated by EXT_sampleCycle, thus causing the state machine to transition synchronously with the SysClk transition between cycles 8 and 9.

As is seen in FIG. 4, to perform the write transfer on the external bus the DMA master 22 state machine goes through four states; setup, wait, transfer and hold. Each of these states is one cycle long at the external bus clock speed. After entering the setup state, the state machine is again clocked on the next EXT_sampleCycle to enter the wait state. During the wait state the DMA master asserts DMA_extAck and maintains assertion of DMA_extAck through then next state of the DMA state machine. The transfer state is entered in cycle 15 from the wait state when the DMA state machine is in the wait state and is clocked by the SysClk gated with EXT_sampleCycle in cycle 14. The DMA state machine enters the hold state in cycle 18 when the state machine is clocked with SysClk gated with EXT_sampleCycle in cycle 17. During the hold state the DMA master 22 de-asserts DMA_extAck and asserts DMA_endOp to signal the EBIU Slave 26 that the transfer has been completed and to stop driving data.

Figure 5:
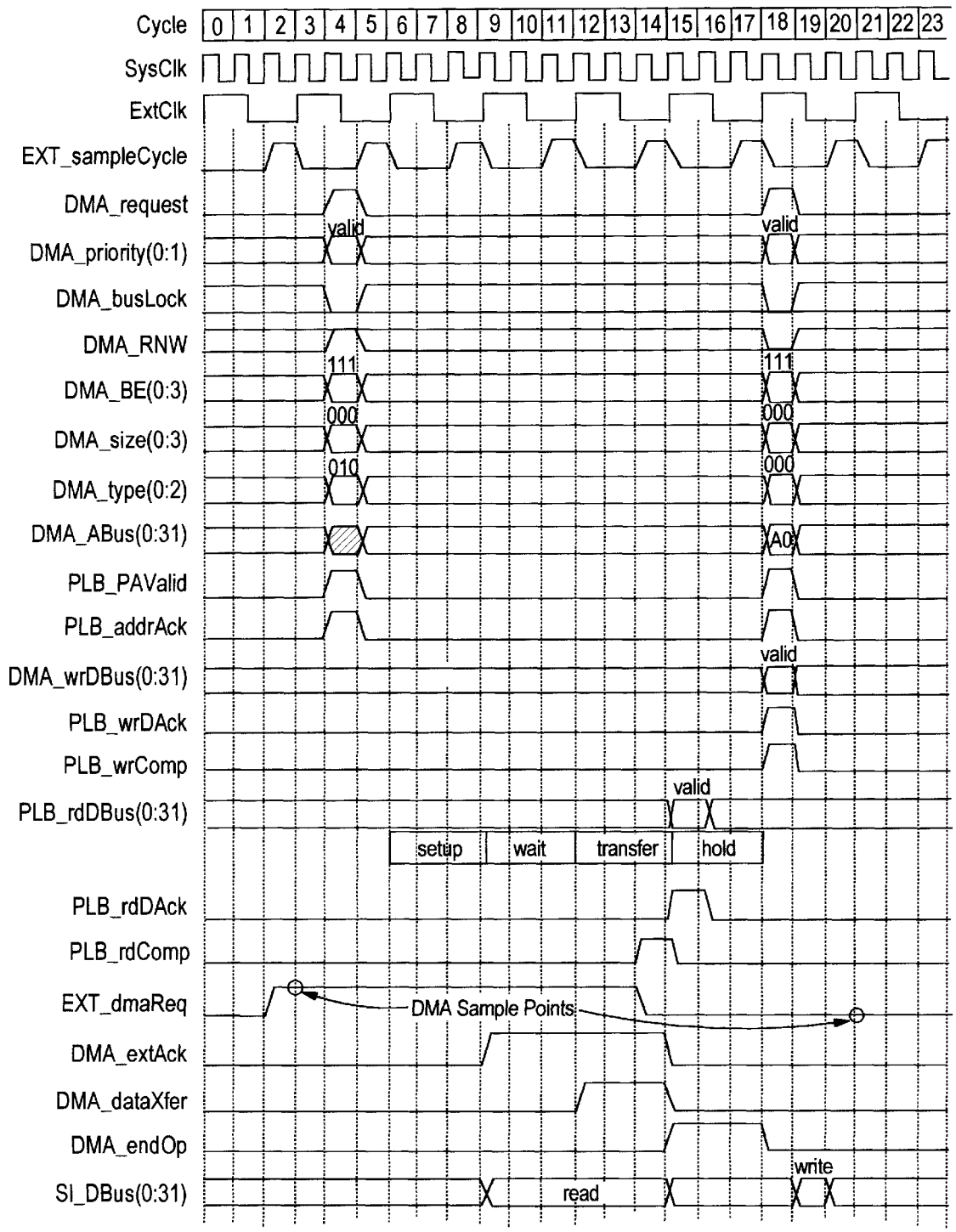
FIG. 5 is a timing diagram illustrating a read operation in a system according to the embodiment of the present invention illustrated in FIG. 2.

An example of a DMA read operation is seen in FIG. 5 where external peripheral 40 initiates a request by activating EXT_dmaReq in cycle 1. For purposes of illustration, the external clock (ExtClk) associated with the External Bus is ⅓ the clock frequency of SysClk which is the clock associated with the processor local bus. The DMA master 22 double synchronizes EXT_dmaReq to the SysClk and responds by requesting from the arbiter 24 a read transfer from the EBIU Slave 26. This transfer request is seen in cycle 5 by the assertion of DMA_request with the address and TQual information also being asserted. The request is acknowledged by the assertion of PLB_addrAck which is provided to DMA master 22 as DMA_addrAck incident with EXT_sampleCycle. The DMA master 22 inserts one external clock cycle of setup time (illustrated as "setup" in FIG. 5) and then asserts DMA_extAck in cycle 9. The DMA master 22 knows the duration of the external clock cycle through the use of EXT_sampleCycle as the "setup" state of the state machine in the DMA master 22 is clocked with the SysClk gated by EXT_sampleCycle, thus causing the state machine to transition synchronously with the SysClk transition between cycles 5 and 6.

As is seen in FIG. 5, to perform the read transfer on the external bus the DMA master 22 state machine goes through four states; setup, wait, transfer and hold. Each of these states is one cycle long at the external bus clock speed. After entering the setup state, the state machine is again clocked on the next EXT_sampleCycle to enter the wait state (cycle 8). During the wait state the DMA master asserts DMA_extAck and maintains assertion of DMA_extAck through the next state of the DMA state machine. The transfer state is entered in cycle 12 from the wait state when the DMA state machine is in the wait state and is clocked by the SysClk gated with EXT_sampleCycle in cycle 11. The peripheral provides the data on the external bus and the DMA master 22 asserts the DMA_dataxfer signal during the transfer state to signal the EBIU Slave 26 to latch the data. The EBIU 26 then asserts PLB_rdComp to the arbiter incident with the EXT_sampleCycle during the transfer state (cycle 14). The DMA state machine enters the hold state in cycle 15 when the state machine is clocked with SysClk gated with EXT_sampleCycle in cycle 14. During the hold state the DMA master 22 de-asserts DMA_extAck and DMA_dataXfer and asserts DMA_endOp. When DMA_extAck is no longer asserted, the EBIU Slave 26 provides the data to the DMA master 22 and asserts PLB_rdDAck which is provided to the DMA master 22 as DMA_rdDAck to signify that the data is provided on PLB_rdDBus and corresponding DMA_rdDBus. As is illustrated in FIG. 5, the data is transferred in one SysClk cycle on the processor local bus.

The DMA master 22 receives the data from the DMA_rdDBus and buffers the data internally. On the next SysClk gated with EXT_sampleCycle the state machine exits the hold state and the transfer on the low speed external bus is complete. The DMA master then requests a write transfer on the processor local bus by asserting DMA_request and the operation is completed with the receipt of PLB_addrAck, PLB_wrDAck and PLB_wrComp which are provided to the DMA master as DMA_addrAck, DMA_wrDAck and DMA_wrComp. The DMA master 22 then waits for another peripheral request to see if another transfer is requested.

The above operations illustrate how the EXT_sampleCycle signal may be utilized to control operations on two buses operating at two different clock speeds. As will be appreciated by those of skill in the art, the present invention is not limited to the implementation described herein but may be utilized with any number of low speed buses. Similarly, while the present invention has been described with respect to a ⅓× lower clock speed, the present examples are equally applicable to other 1/N integer multiples of the higher clock speed bus. Furthermore, as the transitions between states of the state machine is controlled by the EXT_sampleCycle, any combination of bus speeds may be used with the same DMA master 22 thus allowing a single master function to operate with buses of differing speeds.

As is seen in FIG. 4 and FIG. 5, the EXT_sampleCycle signal is preferably only asserted for a single cycle of the higher speed clock SysClk. Preferably, this assertion of EXT_sampleCycle occurs immediately prior to a transition in the external clock so as to gate the cycle of SysClk just prior to the transition of ExtClk. By using EXT_sampleCycle to gate the SysClk the operations of the external bus and the processor local bus may be synchronized so that operations occur on SysClk transitions at either the higher clock speed of SysClk or the lower clock speed of ExtClk. In any event, because the events occur with respect to SysClk the external bus operations are synchronized to SysClk, thus simplifying the design of the DMA master.

The present invention has been described with respect to DMA buffered read and write operations with a peripheral. However, as will be appreciated by those of skill in the art, the present invention may also be applicable to other operations, such as slave buffered transfers, fly-by transfers or other burst transfers or other data transfers.

While the present invention has been described with respect to a DMA master, as will be appreciated by those of skill in the art, the present invention may be utilized in various other environments where it is desired to control communications with peripherals using buses of differing clock speeds. Accordingly, the present invention should not be construed as limited to the DMA setting described herein.

The present invention has been described with respect to positive logic such that a positive voltage corresponds to an active of "1" state of a signal, as will be appreciated by those of skill in the art, the present invention may also be implemented utilizing any suitable means of signifying an active and inactive state.

Furthermore, the present invention has been described with respect to a plurality of master functions and a plurality of slave functions. However, in the event that a single master function is all that is present in a system utilizing the present invention, then the arbiter function of the present invention need not be implemented as a separate function as described above in that the arbiter does not arbitrate between competing masters for the common slave buses. Accordingly, in the event of a single master function, the master function would always have access to the slave buses thus eliminating the need for an arbiter function.

With respect to the arbiter function, master functions and slave functions and various operations described above, as will be appreciated by those of skill in the art, these functions may be carried out in any number of implementations while still benefitting from the teachings of the present invention. For example, the teachings of the present invention may be incorporated in a system such as that described in commonly assigned U.S. patent application Ser. No. 08/729,555 entitled METHODS AND ARCHITECTURES FOR OVERLAPPED READ AND WRITE OPERATIONS, the disclosure of which is incorporated herein by reference as if set forth fully.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of carrying out data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed, the method comprising the steps of:

receiving, from a device associated with the clock domain of the second data bus, a sample signal associated with the second clock speed; and dynamically adjusting the speed of operation of a state machine of a peripheral controller in response to the sample signal by gating a clock at the first clock speed which clocks the state machine of the peripheral controller with the sample signal such that the state machine of the peripheral controller operates at the second clock speed and causes operations on the second data bus to occur at the second clock speed.

2. A method according to claim 1, further comprising the steps of:

providing data to and receiving data from the first bus at the first clock speed; and providing data to and receiving data from the second bus at the second clock speed.

3. A method according to claim 1, wherein said receiving step is preceded by the step of generating the sample signal so as to be active during a cycle of the clock at the first clock speed immediately prior to a transition of the clock at the second clock speed.

4. A method according to claim 1, wherein the first bus is an internal processor bus and wherein the second bus is an external peripheral bus.

5. A method according to claim 1, wherein the peripheral controller comprises a DMA controller.

6. A method of carrying out data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed, the method comprising the steps of:

receiving, from a device associated with the clock domain of the second data bus, a sample signal associated with the second clock speed; and dynamically adjusting the speed of operation of a state machine of a peripheral controller in response to the sample signal such that the state machine of the peripheral controller operates at the second clock speed and causes operations on the second data bus to occur at the second clock speed;

wherein said step of dynamically adjusting comprises the step of gating a clock operating at the first clock speed which clocks a state machine of a peripheral controller with the sample signal such that the state machine of the peripheral controller operates at the second clock speed and causes operations on the second data bus to occur at the second clock speed; and wherein said step of gating comprises the step of logical ANDing the sample signal with clock pulses at the first clock speed so as to create a clock of the second clock speed.

7. A method of carrying out data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed, the method comprising the steps of:

receiving, from a device associated with the clock domain of the second data bus, a sample signal associated with the second clock speed; and dynamically adjusting the speed of operation of a state machine of a peripheral controller in response to the sample signal such that the state machine of the peripheral controller operates at the second clock speed and causes operations on the second data bus to occur at the second clock speed; and wherein the peripheral controller further controls communications between the first bus and a second peripheral device associated with a third bus which operates at a third clock speed which is different from the first clock speed and a 1/N integer multiple of the first clock speed, the method further comprising the steps of:

receiving, from a device associated with the clock domain of the third data bus, a second sample signal associated with the third clock speed; and dynamically adjusting the speed of operation of the state machine of a peripheral controller in response to the second sample signal such that the state machine of the peripheral controller operates at the third clock speed and causes operations on the third data bus to occur at the third clock speed.

8. A method according to claim 7, wherein said step of dynamically adjusting the speed of operation of the state machine, comprises the step of gating the clock operating at the first clock speed which clocks the state machine of the peripheral controller with the second sample signal so as to provide clock pulses to the state machine at the third clock speed such that the state machine of the peripheral controller causes operations on the third data bus to occur at the third clock speed.

9. A method according to claim 7, wherein the second clock speed and the third clock speed are different clock speeds.

10. A peripheral controller for controlling data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed, comprising:

means for receiving from a device associated with the clock domain of the second data bus a sample signal associated with the second clock speed;

means for providing control signals to the peripheral device for controlling operation of the peripheral device; and means for dynamically adjusting the speed of operation of the means for providing control signals to the peripheral device comprising:

means for gating a clock operating at the first clock speed which clocks the means for providing control signals with the sample signal so as to provide clock pulses to the means for providing control signals at the second clock speed such that the means for providing control signals causes operations on the second data bus to occur at the second clock speed.

11. A system according to claim 10, further comprising:

means for providing data to and receiving data from the first bus at the first clock speed; and means for providing data to and receiving data from the second bus at the second clock speed.

12. A system according to claim 10, further comprising means for generating the sample signal so as to be active during a cycle of the clock at the first clock speed immediately prior to a transition of the clock at the second clock speed.

13. A system according to claim 10, wherein the first bus is an internal processor bus and wherein the second bus is an external processor bus.

14. A system according to claim 10, wherein the peripheral controller comprises a DMA controller.

15. A peripheral controller for controlling data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed, comprising:

means for receiving from a device associated with the clock domain of the second data bus a sample signal associated with the second clock speed;

means for providing control signals to the peripheral device for controlling operation of the peripheral device; and means for dynamically adjusting the speed of operation of the means for providing control signals to the peripheral device such that operations on the second data bus to occur at the second clock speed;

wherein said means for dynamically adjusting comprises means for gating a clock operating at the first clock speed which clocks the means for providing control signals with the sample signal so as to provide clock pulses to the means for providing control signals at the second clock speed such that the means for providing control signals causes operations on the second data bus to occur at the second clock speed; and wherein said means for gating comprises means for logical ANDing the sample signal with clock pulses at the first clock speed so as to create a clock of the second clock speed.

16. A peripheral controller for controlling data transfer operations between a first data bus and a peripheral device associated with a second data bus, wherein the first data bus operates at a first clock speed and wherein the second data bus operates at a second clock speed which is different from the first clock speed and a 1/N integer multiple of the first clock speed, comprising:

means for receiving from a device associated with the clock domain of the second data bus a sample signal associated with the second clock speed;

means for providing control signals to the peripheral device for controlling operation of the peripheral device; and means for dynamically adjusting the speed of operation of the means for providing control signals to the peripheral device such that operations on the second data bus to occur at the second clock speed; and wherein the peripheral controller further controls communications between the first bus and a second peripheral device associated with a third bus which operates at a third clock speed which is different from the first clock speed and a 1/N integer multiple of the first clock speed, the method further comprising the steps of:

means for receiving from a device associated with the clock domain of the third data bus a second sample signal associated with the third clock speed;

means for providing control signals to the second peripheral device for controlling operation of the second peripheral device; and means for dynamically adjusting the speed of operation of the means for providing control signals to the second peripheral device such that operations on the third data bus occur at the third clock speed.

17. A system according to claim 16, wherein said means for dynamically adjusting comprises means for adjusting the speed of operation of the means for providing control signals to the second peripheral device such that operations on the third data bus occur at the third clock speed comprises means for gating a clock operating at the first clock speed which clocks the means for providing control signals with the second sample signal so as to provide clock pulses to the means for providing control signals at the third clock speed such that the means for providing control signals at third clock speed causes operations on the third data bus to occur at the third clock speed.

18. A system according to claim 16, wherein the second clock speed and the third clock speed are different clock speeds.

19. A communication system for allowing DMA communication between multiple buses, comprising:

a first bus utilizing a first clock operating at a first clock speed;

a second bus utilizing a second clock operating at a second clock speed wherein the second clock speed is different from the first clock speed and is a 1/N integer multiple of the first clock speed;

a first bridge slave which transmits and receives data to and from the first bus and transmits and receives data to and from the second bus, wherein the bridge generates a first sample signal so as to be active during a cycle of the first clock immediately prior to a transition of the second clock and provides the first sample signal corresponding to the second clock speed; and a DMA master operably associated with the first bridge slave and which generates control signals for controlling communications to and from the first and second buses and includes a DMA state machine corresponding to a transfer state on the second bus, wherein the DMA state machine is clocked by the first clock gated with the first sample signal from the first bridge slave so as to clock the DMA state machine at the second clock speed.

20. A system according to claim 19, wherein the first bus is an internal bus and wherein the second bus is an external bus.

21. A system according to claim 19, wherein the first bridge slave transmits and receives data to and from the first bus at the first clock speed and transmits and receives data from the second bus at the second clock speed.

22. A communication system for allowing DMA communication between multiple buses, comprising:

a first bus utilizing a first clock operating at a first clock speed;

a second bus utilizing a second clock operating at a second clock speed wherein the second clock speed is different from the first clock speed and is a 1/N integer multiple of the first clock speed;

a first bridge slave which transmits and receives data to and from the first bus and transmits and receives data to and from the second bus, wherein the bridge provides a first sample signal corresponding to the second clock speed; and a DMA master operably associated with the first bridge slave and which generates control signals for controlling communications to and from the first and second buses and includes a DMA state machine corresponding to a transfer state on the second bus, wherein the DMA state machine is clocked by the first clock gated with the first sample signal from the first bridge slave so as to clock the DMA state machine at the second clock speed; and wherein the DMA master includes an AND gate for ANDing the first sample signal with the first clock so as to create a clock operating at the second clock frequency.

23. A communication system for allowing DMA communication between multiple buses, comprising:

a first bus utilizing a first clock operating at a first clock speed;

a second bus utilizing a second clock operating at a second clock speed wherein the second clock speed is different from the first clock speed and is a 1/N integer multiple of the first clock speed;

a first bridge slave which transmits and receives data to and from the first bus and transmits and receives data to and from the second bus, wherein the bridge provides a first sample signal corresponding to the second clock speed;

a DMA master operably associated with the first bridge slave and which generates control signals for controlling communications to and from the first and second buses and includes a DMA state machine corresponding to a transfer state on the second bus, wherein the DMA state machine is clocked by the first clock gated with the first sample signal from the first bridge slave so as to clock the DMA state machine at the second clock speed;

a third bus utilizing a third clock operating at a third clock speed wherein the third clock speed is a 1/N integer multiple of the first clock speed;

a second bridge slave which transmits and receives data to and from the first bus and transmits and receives data to and from the third bus, wherein the bridge provides a second sample signal corresponding to the third clock speed; and wherein the DMA master is further operably associated with the second bridge slave and generates control signals for controlling communications to and from the first and third buses and wherein the DMA state machine is clocked by the first clock gated with the first sample signal from the first bridge slave so as to clock the DMA state machine at the third clock speed when communicating between the first and second buses and the DMA state machine is clocked by the first clock gated with the second sample signal from the second bridge slave so as to clock the DMA state machine at the third clock speed when communicating between the first and third buses.

24. A system according to claim 23, wherein the second and third clock speed are different clock speeds.

* * * * *